United States Patent [19]

Pfeuffer et al.

[11] 4,072,300
[45] Feb. 7, 1978

[54] CONTINUOUS CASTING CUT-OFF DEVICE

[75] Inventors: Alfred Pfeuffer, Neu-Isenburg, Germany; Herbert Rudolf, Brookfield; Fred Balfanz, Waukesha, both of Wis.

[73] Assignee: C-R-O, Inc., Menomonee Falls, Wis.

[21] Appl. No.: 741,289

[22] Filed: Nov. 11, 1976

[51] Int. Cl.² .............................................. B23K 7/00
[52] U.S. Cl. ...................................... 266/50; 266/90 Z
[58] Field of Search .................... 164/263; 266/50, 72, 266/73, 90 Z; 148/9 R, 9.6

[56] References Cited

U.S. PATENT DOCUMENTS

| 2,317,239 | 4/1943 | Yoch | 266/902 X |
| 3,692,292 | 9/1972 | Rokop et al. | 266/50 |
| 3,704,012 | 11/1972 | Pfeuffer et al. | 266/50 |
| 3,901,491 | 8/1975 | Vertesi et al. | 266/50 |
| 3,912,242 | 10/1975 | Schoffmann | 164/263 X |
| 3,929,324 | 12/1975 | Lotz et al. | 266/50 |

*Primary Examiner*—Roy Lake
*Assistant Examiner*—Paul A. Bell
*Attorney, Agent, or Firm*—Andrus, Sceales, Starke & Sawall

[57] ABSTRACT

A cut-off device for a horizontally moving continuous casting includes a carriage assembly carrying a cut-off torch mechanism and a clamping mechanism. The assembly is mounted for reciprocable movement on a rod-like track which is open-ended to permit fast removal of the assembly for repairs. When the assembly is clamped to the moving casting, it is carried along therewith while the torch cuts through the casting to form billets of desired length. The track is floatingly mounted to permit deviation from the vertical by the casting without adversely affecting the cutting operation. The carriage assembly is tiltable on the track to permit horizontal deviation of the clamped casting. The torch is operated by a cam having a drop-off portion which quickly returns the torch to starting position. Upon release of the clamping mechanism, a damped counterweight automatically returns the carriage assembly to its initial position on the track.

18 Claims, 5 Drawing Figures

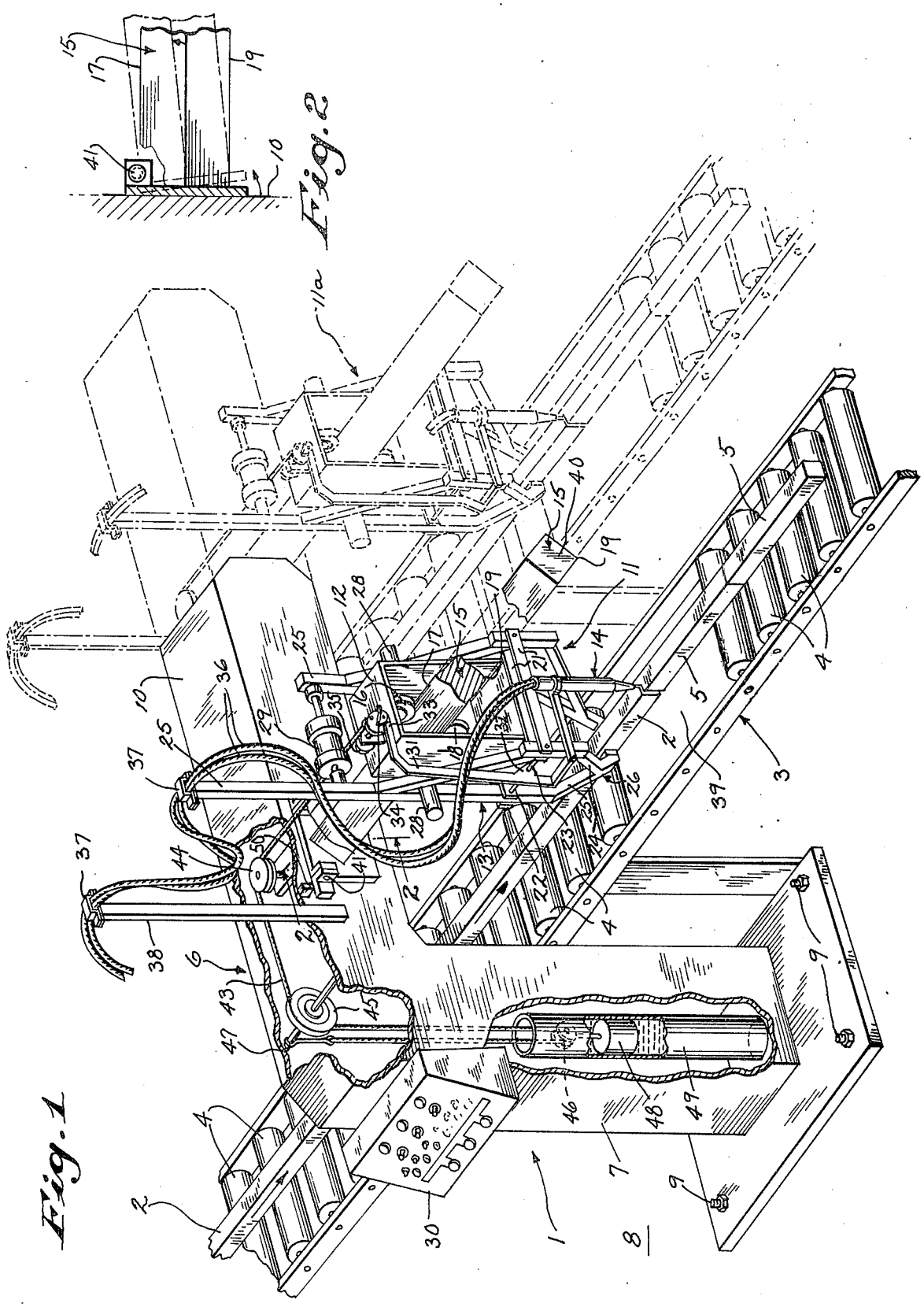

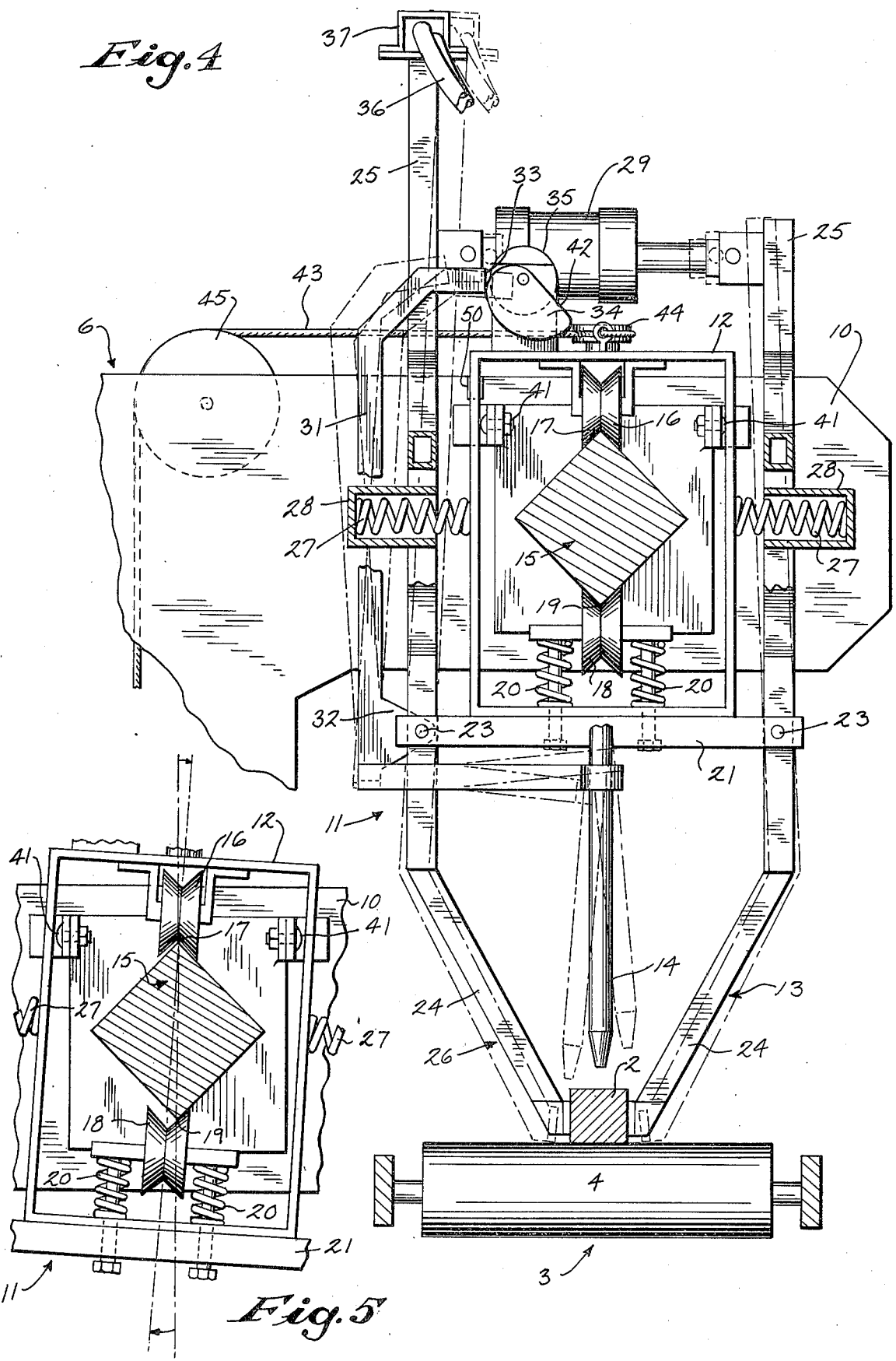

CONTINUOUS CASTING CUT-OFF DEVICE

BACKGROUND OF THE INVENTION

This invention relates to a continuous casting cut-off device and more particularly to a carriage mounted torch-type apparatus for cutting a continuously moving metal casting in the form of a bar into short pieces or billets.

In known continuous casting procedures, the metal strand or bar often is discharged downwardly and then curved into a horizontal position where the bar moves continuously along a bed.

Previously known devices for cutting a horizontally moving bar have included a large ponderous carriage movable along the bed and providing a vertical support leg on each side of the bed with a large bridge spanning the space between the upper ends of the legs and disposed over the bar. The cutting torch mechanism was suspended from the carriage, the latter also mounting a bar clamping mechanism. When the clamping mechanism was clamped to the moving bar, the carriage and torch were carried along with the bar while the torch would cut through the bar. At the end of the cut, the clamping mechanism was released from the bar and the carriage was manually or selectively actuated to return it to its starting position.

Such known devices have been subject to a number of disadvantages.

For example, in the event of a malfunction or breakdown in the bar clamping mechanism, the torch cutting mechanism or other parts related to the carriage, the cutting operation has to be terminated for repair work. Nevertheless, the casting or bar must continue to move along the bed during repairs, due to the nature of the continuous casting process. Since the known devices do not lend themselves to particularly fast repairs, the amount of uncut metal which is wasted can be quite large.

Furthermore, vertical or horizontal deviations in the moving bar can cause problems in accuracy of cut and the like.

Also, it is desirable to return the transversely movable cutting torch to its start position as fast as possible to prepare the torch for the next cut. In the known devices, the torch return has been relatively slow.

In addition, manual or selective carriage return is not particularly fast and efficient and the known mechanisms are usually quite costly.

SUMMARY OF THE INVENTION

The concept of the present invention substantially eliminates the above-mentioned and other disadvantages and provices a novel device having a number of unique features.

In accordance with one aspect of the invention, the previous ponderous moving bridge is eliminated and the torch and bar clamp mounting carriage is disposed for reciprocable movement along a downstream facing support, such as a track rod. The support rod is open-ended. Therefore, in the event of a malfunction of the type heretofore referred to, the entire carriage assembly may be quickly removed for ease of repair or for quick replacement by a properly functioning assembly. The "down time" of the cutting operation is therefor substantially reduced from known devices, with a reduction in waste of the uncut moving casting.

In accordance with another aspect of the invention, the track rod is mounted at its inner end so that the rod can float vertically in the event the moving casting deviates from the vertical. In addition, the carriage is tiltable on the track rod about a horizontal axis in the event the moving casting deviates from the horizontal.

In accordance with yet another aspect of the invention, the cutting torch is operated for transverse movement by a cam which is provided with a drop-off on its face. The drop-off portion causes a quick return of the torch to starting position which is substantially faster than the speed of bar cutting.

In accordance with a further aspect of the invention, the carriage assembly is connected to a simple mechanism which continuously biases it toward starting position, even during cutting. When the clamp mechanism releases from the moving bar, the carriage assembly is immediately and automatically returned to starting position. In the embodiment disclosed herein the biasing mechanism comprises a counter-weight disposed in a column of liquid, the latter acting as a continuous braking or damping valve for the moving weight.

BRIEF DESCRIPTION OF THE DRAWINGS

The accompanying drawings illustrate the best mode presently contemplated by the inventor for carrying out the invention.

In the drawings:

FIG. 1 is a perspective view of a continuous casting cut-off device constructed in accordance with the concepts of the invention, with parts broken away;

FIG. 2 is an enlarged fragmentary view taken on line 2—2 of FIG. 1;

FIG. 4 is a front elevation of the carriage assembly with parts broken away and in section; and FIG. 5 is a view somewhat similar to FIG. 4 and showing carriage tiltability.

DESCRIPTION OF THE PREFERRED EMBODIMENT

Figure 3:
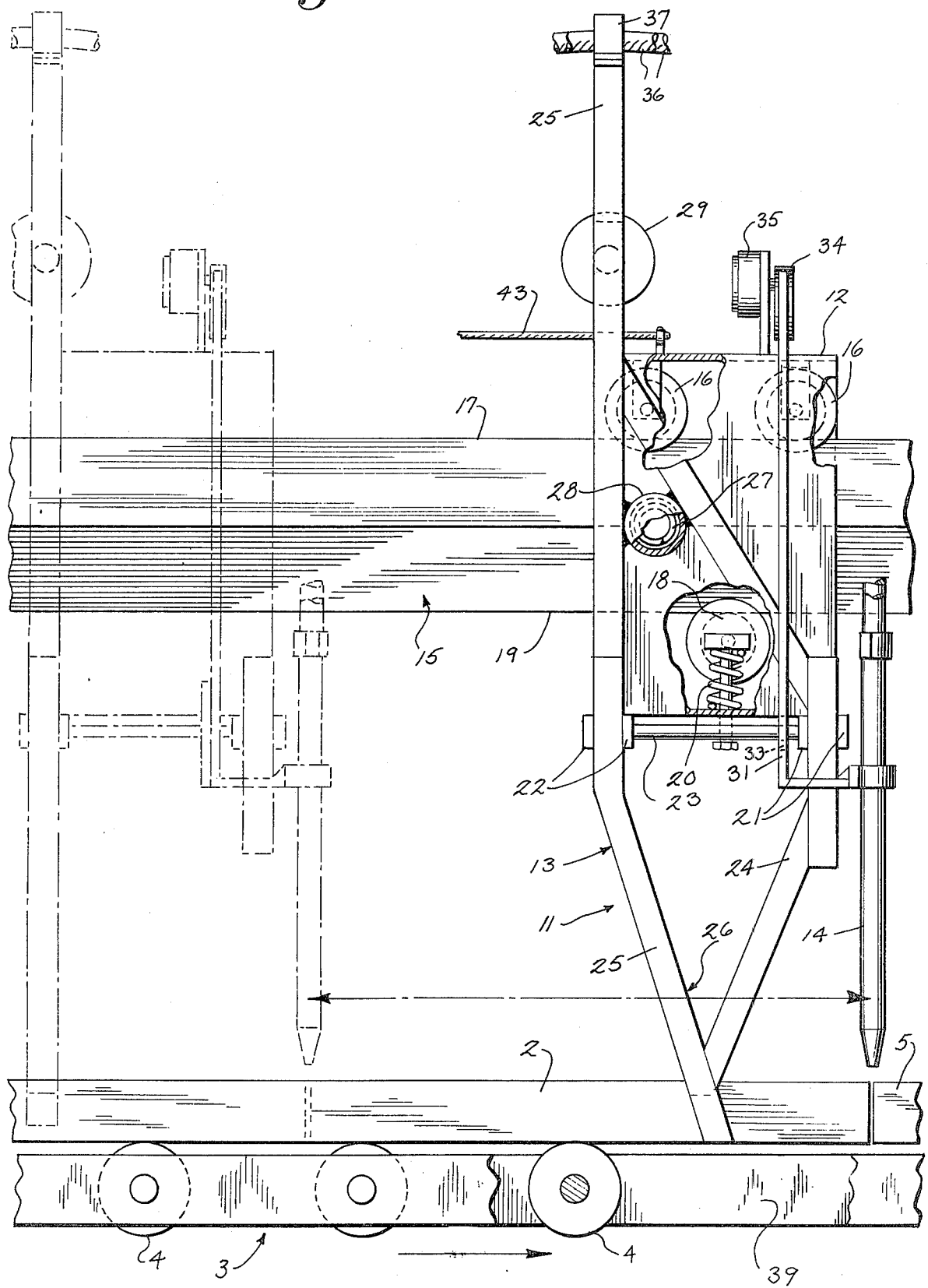
FIG. 3 is an enlarged fragmentary side elevation of the carriage assembly.

As shown in the drawings, the invention is directed to a cut-off device 1 for severing a horizontally moving continuous casting in the form of a bar or the like 2. The bar has been previously continuously cast in a mechanism of any suitable well-known type, not shown, and moves longitudinally and continuously along an elongated horizontal bed 3 which in this instance includes a plurality of supporting rollers 4.

It is desired to sever the moving bar 2 into a plurality of separate billets 5. For this purpose, a cut-off assembly 6 is mounted adjacent bed 3. As shown in FIG. 1, assembly 6 comprises a frame including an upright pedestal 7 fixedly mounted to the floor 8, as by bolts 9, the upper end of pedestal 7 merging into a horizontal arm 10 which transversely overlies bed 3. In the embodiment shown in full lines in FIG. 1, arm 10 is supported solely by pedestal 7.

For purposes of bar cut-off, a carriage assembly 11 is disposed over bed 3 and comprises a rectangular box-like frame 12 which carries a transversely movable bar clamping mechanism 13 as well as a transversely movable torch 14. Carriage assembly 11 is mounted for reciprocable longitudinal movement along a track means, which in this instance comprises an elongated shaft 15 of rectangular cross section which is secured at one end to arm 10 and which extends forwardly therefrom above and parallel to bed 3. A pair of V-shaped upper rollers 16 are secured to the under side of the top wall of frame 12 and are adapted to ride along the top edge 17 of shaft 15. A V-shaped lower roller 18 is positioned within the lower portion of frame 12 and is biased upwardly against the lower edge 19 of shaft 15, as by springs 20, to transversely stabilize the suspended carriage assembly 11. The opposite edges 17 and 19 of shaft 15 are, of course, vertically aligned, and the remaining opposite edges are horizontally aligned, as can best be seen in FIG. 4.

Carriage assembly 11 is normally positioned closely adjacent arm 10, as shown in phantom in FIG. 3.

During operation of the device, it is desired to clamp assembly 11 to the moving bar 2 so that the assembly is carried forwardly with the bar during the severing operation. For this purpose, a pair of transversely extending spaced supports 21 are suitably secured to the front lower portion of frame 12; with a similar pair of supports 22 being secured to the rear lower portion of the frame. The outer ends of supports 21 and 22, which extend beyond the frame, serve as end bearings for a pair of longitudinally extending pivot rods 23. Each rod 23 pivotally mounts the front and rear legs 24 and 25 of the lower Y-shaped portion of a clamp body 26. As shown, each front clamp leg 24 is disposed between the spaced front supports 21, while each rear clamp leg 25 is disposed between the spaced rear supports 22.

Front clamp legs 24 terminate slightly above supports 21, while rear clamp legs 25 extend to above frame 12 and are biased outwardly above the pivotal connections by a pair of transversely extending springs 27 which bear on the side walls of frame 12 and extend into retainers 28 on legs 25. The action of springs 27 is in a direction tending to cause clamping of the moving bar 2. However, this is normally counteracted by a cylinder-piston assembly 29 extending transversely between rear legs 25 above frame 12. Assembly 29 may be actuated by any suitable well-known means, not shown, from a control panel 30 on pedestal 7. In its normal position, assembly 29 is retracted to release the clamping means from bar 2 against the force of springs 27. When assembly 29 is suitably actuated from panel 30 to permit piston extension, springs 27 will cause the clamps to engage bar 2 and the entire carriage assembly 11 will then "fly along" with the bar, and gradually move to the position shown in full lines in FIG. 3.

As carriage assembly 11 moves longitudinally with bar 2, to which it is locked, the bar is severed by action of cutting torch 14. For this purpose, torch 14 is secured to a transverse pivoting means which in the embodiment shown comprises a compound lever 31 having a central lug portion 32 which is mounted for pivotal movement on outer rod 23. The upper end portion of lever 31 extends horizontally above carriage frame 12 and functions as a follower 33 disposed in engagement with a cam 34 which is rotatably driven by a motive means such as an air motor 35 secured to the top wall of frame 12. By using an air motor, the speed of cam rotation and resultant transverse pivoting of torch 14 along its cutting path, is easily adjustable, depending on the size of the workpiece. The pivotal torch positions from beginning to end of the cut are best shown in FIG. 3.

Torch 14 is provided with suitable fuel through conduits 36 which may extend through channel members 37 disposed on an upper extension of one rear clamping leg 25 as well as on a post 38 extending upwardly from arm 10.

During the torch cutting operation, the torch flame extends downwardly and might cause damage to any structure disposed beneath bar 2. Therefor, rollers 4 are removed from that portion of the bed which is beneath the path of movement of the torch, thus creating a short gap 39.

As previously indicated, in the event of malfunction of carriage assembly 11 or any mechanism mounted thereto, it is important that the assembly be put back in operation so that the cutting procedure is disrupted for only the shortest possible time. The structure disclosed is believed to reduce the "down time" for cutting to a minimum. For this purpose, the shaft-like track member 15 is open-ended remote from arm 10. That is, its outer end is unobstructed. Its downstream portion terminates at face 40 which is slightly beyond the maximum downstream travel of assembly 11 during cutting. If a malfunction should occur, the entire assembly may be easily rolled off the end of member 15 so that it may be more easily repaired. If desired, a properly working assembly may quickly be substituted for the malfunctioning assembly, so that the latter may be repaired at leisure.

In some instances, the moving bar 2 may deviate from a straight longitudinal configuration.

For example, the bar 2 may have a vertical rise along its length, which could cause damage to the clamping mechanism and the torch. It is therefor contemplated that means are provided to permit track member 15 to float vertically in response to a vertical force on clamp legs 24 and 25 due to raising of bar 2. For this purpose, and as best shown in FIG. 2, the inner root end of member 15 is mounted to arm 10 as on a pivot shaft 41. It is therefor free to raise and lower, as shown, carrying with it carriage assembly 11, frame 12, bar clamping mechanism 13 and torch 14.

By the same token, bar 2 may deviate horizontally, and means are provided to permit tilting of the elements 11-14 about a longitudinal horizontal axis so that torch 14 can continue cutting continuously. For this purpose, and as best shown in FIG. 5, the V-shaped rollers 16 and 18 cooperate with the edges 17 and 19 of track member 15 and can ride sideways on the latter to permit tilting or rocking movement of the entire suspended assembly.

Furthermore, and as previously discussed, it is desirable to return torch 14 to its initial position after cut-off as quickly as possible. For this purpose, the face of cam 34 is provided with a sudden drop-off following surface portion 42 which is positioned to cause the follower 33 and torch 14 to quickly move back to start position.

In addition, and as previously mentioned, it is desirable to return carriage assembly 11 to its starting position automatically, simply and fast. For this purpose, assembly 11 is attached to a cable 43 which extends rearwardly from the assembly and around a first pulley 44 mounted within hollow arm 10 and then downwardly over a second pulley 45 and under a third pulley 46 and upwardly to a fixed connection at 47. Pulley 46 is attached to a counter-weight 48 disposed in a fluid filled vertical damping tube 49 disposed within hollow pedestal 7 and remote from assembly 11. Weight 48 is just slightly smaller than the inner diameter of tube 49, thus providing a valve-like device.

The counter-weight mechanism provides a speed controlled biasing force on carriage assembly 11 in an upstream direction, causing the assembly, when it is free, to engage a stop 50 on arm 10. When clamping mechanism 13 engages the moving bar 2, the force of counter-weight 48 will be overcome and the assembly will move forwardly along track member 15 for bar cutting. As soon as the cut is completed and the clamp released, counter-weight 48 immediately functions to automatically return assembly 11 rearwardly until it engages the limiting stop 50.

The device incorporating the invention has been described in connection with a single bed 3, bar 2 and severing mechanism. However, where a plurality of parallel beds and moving bars are arranged in side-by-side relationship, arm 10 may be extended so that it can support one or more additional carriage assemblies 11a, as shown in phantom in FIG. 1.

The device of the invention has been found to be extremely useful when it is desired to cut bars of 2½ - 8 inches thickness.

Various modes of carrying out the invention are contemplated as being within the scope of the following claims particularly pointing out and distinctly claiming the subject matter which is regarded as the invention.

We claim:

1. For use with a continuous metal casting apparatus wherein a metal bar moves continuously along an elongated longitudinally extending bed, a cut-off apparatus for the bar, said apparatus comprising:
   (a) a fixed frame support member adapted to extend transversely over the said bed,
   (b) a carriage assembly with said assembly carrying bar clamping means and bar cut-off means,
   (c) and track means extending longitudinally from said frame support and suspending said carriage assembly therefrom for reciprocable movement thereon,
   (d) the outer end of said track means remote from said frame support being unobstructed to facilitate quick removal and replacement of said carriage assembly therefrom.

2. In the apparatus of claim 1: means responsive to positional deviation of the moving bar to cause said carriage assembly and bar cut-off means to follow the deviation when the bar is clamped by said clamping means.

3. The apparatus of claim 2 wherein said last-named means is responsive to vertical deviation of the bar.

4. The apparatus of claim 3 wherein said last-named means comprises means for floatingly mounting said track means to said frame support.

5. The apparatus of claim 2 wherein said last-named means is responsive to horizontal deviation of the bar.

6. The apparatus of claim 5 wherein said last-named means comprises means for mounting said carriage assembly for tilting movement on said track means.

7. The apparatus of claim 6 wherein said carraige mounting means comprises:
   (a) a pair of vertically aligned edges on said track means,
   (b) and substantially V-shaped rollers on said carriage and normally engaged with said edges and rideable sideways relative thereto.

8. In the apparatus of claim 1: means responsive to vertical and horizontal deviation of the moving bar to cause said carriage assembly and bar cut-off means to follow the deviation when the bar is clamped by said clamping means, said responsive means comprising:
   (a) means for floatingly mounting said track means to said frame support for following vertical deviation,
   (b) and means for mounting said carriage assembly for tilting movement on said truck means for following horizontal deviation.

9. The cut-off apparatus of claim 1 wherein the said outer end of said track means terminates downstream of the maximum downstream travel of said carriage assembly.

10. The apparatus of claim 1 in which said bar cut-off means comprises:
    (a) a torch adapted to be disposed adjacent the said moving bar,
    (b) lever means connected to said torch to pivot the latter along a transverse cutting path,
    (c) and cam means for actuating said lever means,
    (d) said cam means including a cam member with the latter having a drop off following surface positioned to cause a quick return of said torch to start position after a cut has been completed.

11. The apparatus of claim 10:
    (a) in which said cam means comprises a rotatable member,
    (b) and which includes an adjustable speed air motor for rotating said member.

12. In the apparatus of claim 1:
    (a) means to selectively actuate said clamping means to thereby clamp said carriage assembly to said moving bar during cutting so that said assembly moves along said track means with said bar, and to release said assembly from said bar upon completion of cutting,
    (b) and counter-weight means to automatically return said carraige to its start position upon said release of said assembly from said bar.

13. The apparatus of claim 12 in which said counter-weight means comprises:
    (a) a cable attached at one end to said assembly,
    (b) a counter-weight mounted on said cable remote from said one end,
    (c) and speed controlling damping means for said counter-weight.

14. The apparatus of claim 13 in which:
    (a) said fixed frame support member includes a hollow pedestal,
    (b) and said counter-weight and damping means are disposed within said pedestal.

15. In the apparatus of claim 13: stop means on said fixed frame support to limit the return travel of said carriage assembly.

16. In the apparatus of claim 10:
    (a) means to selectively actuate said clamping means to thereby clamp said carriage assembly to said moving bar during cutting so that said assembly moves along said track means with said bar, and to release said assembly from said bar upon completion of cutting,
    (b) and counter-weight means to automatically return said carraige to its start position upon said release of said assembly from said bar.

17. The apparatus of claim 16 in which said bar clamping means comprises:
    (a) a pair of transversely spaced Y-shaped clamping members, each having a front and a rear leg,
    (b) a longitudinal rod pivotally mounting each said clamping member,
    (c) spring means biasing said clamping members toward bar clamping position,
    (d) and a cylinder-piston assembly extending transversely between said rear legs and actuatable to selectively unclamp said clamping members from said bar.

18. For use with a continuous metal casting apparatus wherein a metal bar moves continuously along an elongated longitudinally extending bed, a cut-off apparatus for the bar, said apparatus comprising:
   (a) a fixed frame support member adapted to extend transversely over the said bed,
   (b) a carriage assembly with said assembly carrying bar clamping means and bar cut-off means, said last-named means comprising:
      (1) a torch adapted to be disposed adjacent the said moving bar,
      (2) lever means connected to said torch to pivot the latter along a transverse cutting path,
      (3) rotary cam means for actuating said lever means,
      (4) said cam means including a cam member with the latter having a drop off following surface positioned to cause a quick return of said torch to start position after a cut has been completed,
      (5) and drive means for rotating said cam member, said drive means being adjustable so that the speed of cam member rotation and resultant pivoting of said torch is variable.

* * * * *